(12) United States Patent  (10) Patent No.: US 9,019,373 B2
Tasaki et al.  (45) Date of Patent: Apr. 28, 2015

(54) MONITORING DEVICE, METHOD THEREOF (75) Inventors: Tsuyoshi Tasaki, Kanagawa (JP);
Daisuke Yamamoto, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 468 days.

(21) Appl. No.: 13/428,410

(22) Filed: Mar. 23, 2012

(65) Prior Publication Data

US 2013/0063593 A1  Mar. 14, 2013

(30) Foreign Application Priority Data

Sep. 8, 2011  (JP) .................................. 2011-195783

(51) Int. Cl.
  *H04N 7/18* (2006.01)
  *G06T 7/20* (2006.01)
  *G01S 3/786* (2006.01)
  *G06K 9/00* (2006.01)
(52) U.S. Cl.
  CPC ............. *G06T 7/2033* (2013.01); *G01S 3/7864* (2013.01); *G06K 9/00335* (2013.01); *H04N 7/183* (2013.01); *G06T 2207/10016* (2013.01); *G06T 2207/10048* (2013.01); *G06T 2207/30196* (2013.01); *G06T 2207/30232* (2013.01)
(58) Field of Classification Search
  CPC ....... G06K 9/00; G06K 9/00335; H04N 7/18; H04N 7/183; H04N 5/225; H04N 5/23222; H04N 21/254; H04N 21/44222; H04N 21/812; H04N 21/8126; H04N 21/8173; G06T 7/2033; G06T 7/00; G01S 3/7864; G01S 3/786
  USPC ......................................................... 348/143
  See application file for complete search history.

(56) References Cited

U.S. PATENT DOCUMENTS 5,969,755 A * 10/1999 Courtney ....................... 348/143
6,236,736 B1 * 5/2001 Crabtree et al. ............... 382/103
6,424,370 B1 * 7/2002 Courtney ....................... 348/143

(Continued)

FOREIGN PATENT DOCUMENTS

EP  2413304 A1 * 2/2012 ................ G06T 1/16
JP  2004-331021    11/2004

(Continued)

OTHER PUBLICATIONS

UK Search Report dated Jul. 20, 2012 in UK patent application No. 1204852.6.

*Primary Examiner* — Shan Elahi
(74) *Attorney, Agent, or Firm* — Nixon & Vanderhye, P.C.

(57) ABSTRACT

A monitoring device includes an indicating unit configured to indicate an object to be monitored; a camera to acquire time-series images; a predicting unit configured to predict the position of destination of the characteristic points belonging to a first aggregation including characteristic points having an amount of movement larger than a reference amount of movement set in advance; a detecting unit configured to detect the position of center of gravity of the changed area; a determining unit configured to determine the positions of destination as an indicating position when representative amount of movement is larger than a first threshold value and determine the position of center of gravity as the indicating position when the representative amount of movement is smaller than the first threshold value; and a control unit configured to control the indicating unit to cause the indicating unit to indicate the indicating position are provided.

9 Claims, 8 Drawing Sheets

(56) References Cited

U.S. PATENT DOCUMENTS

| | | | |
|---|---|---|---|
| 2004/0032971 A1* | 2/2004 | Nagaoka et al. | 382/103 |
| 2004/0105570 A1* | 6/2004 | Venetianer et al. | 382/100 |
| 2004/0119819 A1* | 6/2004 | Aggarwal et al. | 348/143 |
| 2005/0128291 A1* | 6/2005 | Murakami | 348/143 |
| 2005/0285941 A1* | 12/2005 | Haigh et al. | 348/155 |
| 2006/0023105 A1* | 2/2006 | Kostrzewski et al. | 348/335 |
| 2006/0039584 A1* | 2/2006 | Aichi | 382/107 |
| 2006/0045354 A1* | 3/2006 | Hanna et al. | 382/224 |
| 2006/0053342 A1* | 3/2006 | Bazakos et al. | 714/37 |
| 2006/0104479 A1* | 5/2006 | Bonch-Osmolovskiy et al. | 382/103 |
| 2006/0197839 A1* | 9/2006 | Senior et al. | 348/169 |
| 2006/0224301 A1* | 10/2006 | Sakagami et al. | 701/200 |
| 2007/0035622 A1* | 2/2007 | Hanna et al. | 348/143 |
| 2009/0232357 A1* | 9/2009 | Angell et al. | 382/103 |
| 2012/0041617 A1* | 2/2012 | Aimura et al. | 701/1 |

FOREIGN PATENT DOCUMENTS

| | | |
|---|---|---|
| JP | 2006-135799 | 5/2006 |
| JP | 2009-30837 | 2/2009 |

* cited by examiner

MONITORING DEVICE, METHOD THEREOF

CROSS-REFERENCE TO RELATED APPLICATION

This application is based upon and claims the benefit of priority from the prior Japanese Patent Application No. 2011-195783, filed on Sep. 8, 2011, the entire contents of which are incorporated herein by reference.

FIELD

Embodiments relate to a monitoring device, a method thereof.

BACKGROUND

A device configured to detect a moving substance with an infrared ray camera, estimate the position of the moving substance from the amount of movement and the direction of movement thereof in a short time and irradiate a laser beam, a device configured to detect an area of movement by acquiring a difference of images and fan the area of movement, and a device configured to take images of an object to be monitored, detect the position of the center of gravity of the object to be monitored from the images, and track the movement of the position of the center of gravity are proposed.

However, in the devices of the related art, if a tracking device having a low response performance is used, there is a problem that the tracking movement cannot keep up with that of the object to be monitored which moves at a high speed at a short distance.

DETAILED DESCRIPTION

According to one embodiment, there is provided a monitoring device including: an indicating unit configured to indicate an object to be monitored; a camera to take an image of the object to be monitored and acquire time-series images; a predicting unit configured to extract a plurality of characteristic points from the time-series images, calculate the amounts of movement of the respective characteristic points, predict the position of destination of the characteristic points belonging to a first aggregation including characteristic points having an amount of movement larger than a reference amount of movement set in advance, and obtain an representative amount of movement that is an representative value of amounts of movement of the respective characteristic points belonging to the first aggregation; a detecting unit configured to extract a changed area on the basis of a difference between time-series images, and detect the position of center of gravity of the changed area; a determining unit configured to determine the positions of destination as an indicating position when the representative amount of movement is larger than a first threshold value and determine the position of center of gravity as the indicating position when the representative amount of movement is smaller than the first threshold value; and a control unit configured to control the indicating unit to cause the indicating unit to indicate the indicating position.

In this configuration, reliably tracking is achieved even when the object to be monitored is moved.

A monitoring device 10 according to one embodiment will be described based on the drawings.

Figure 1:
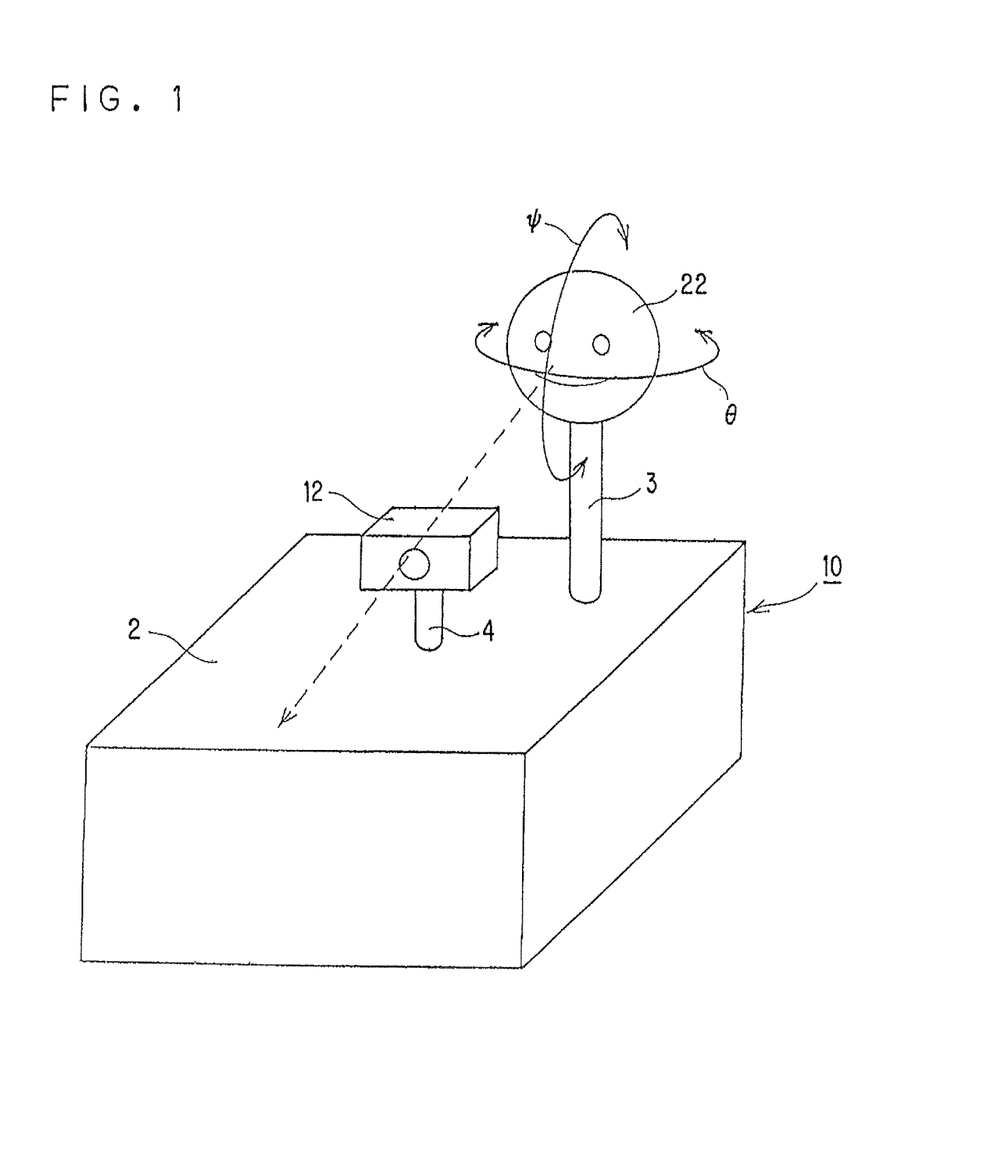
FIG. 1 is a perspective view of a self cash register having a monitoring device according to an embodiment.

The monitoring device 10 in the embodiment is a device to be provided in self cash registers 1 which are installed recently in supermarkets or convenience stores as shown in FIG. 1. The self cash register 1 is configured to monitor customers to prevent the customers from doing dishonest acts when the customers take out products from baskets and pay bills by themselves.

Figure 5:
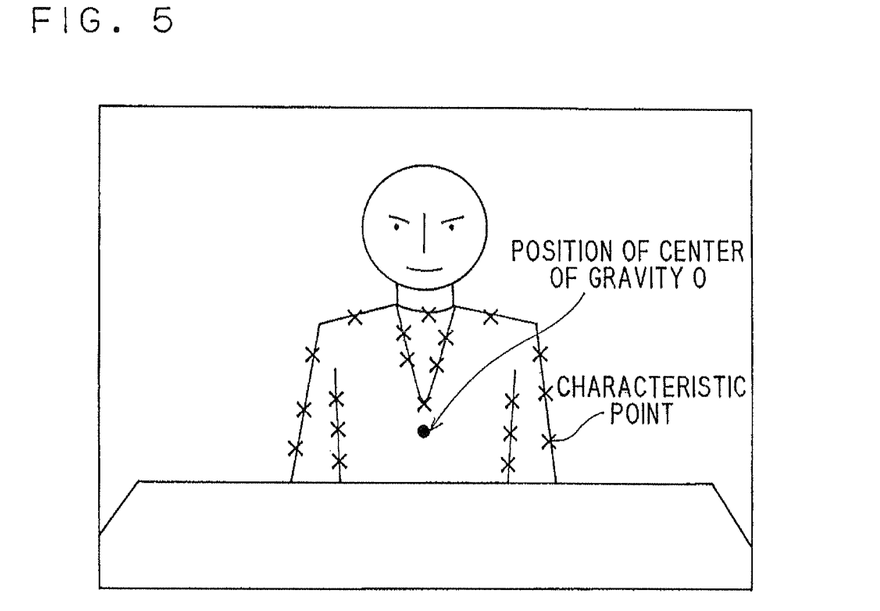
FIG. 5 is a drawing showing a first image taken by a camera.

In order to do so, the monitoring device 10 takes images of customers who make a payment with a camera 12 as shown in images in FIGS. 5 to 7, and causes a face of a doll which causes the customers to feel like being watched (hereinafter, referred to as "indicating unit 22") to track the movement of customers' hands as shown in FIG. 1. Accordingly, the customers feel like being watched by the face of the doll so that the dishonest acts are prevented.

First Embodiment

Referring now to FIG. 1 to FIG. 6, the monitoring device 10 according to a first embodiment will be described.

A configuration of the monitoring device 10 will be described on the basis of a block diagram in FIG. 2.

Figure 2:
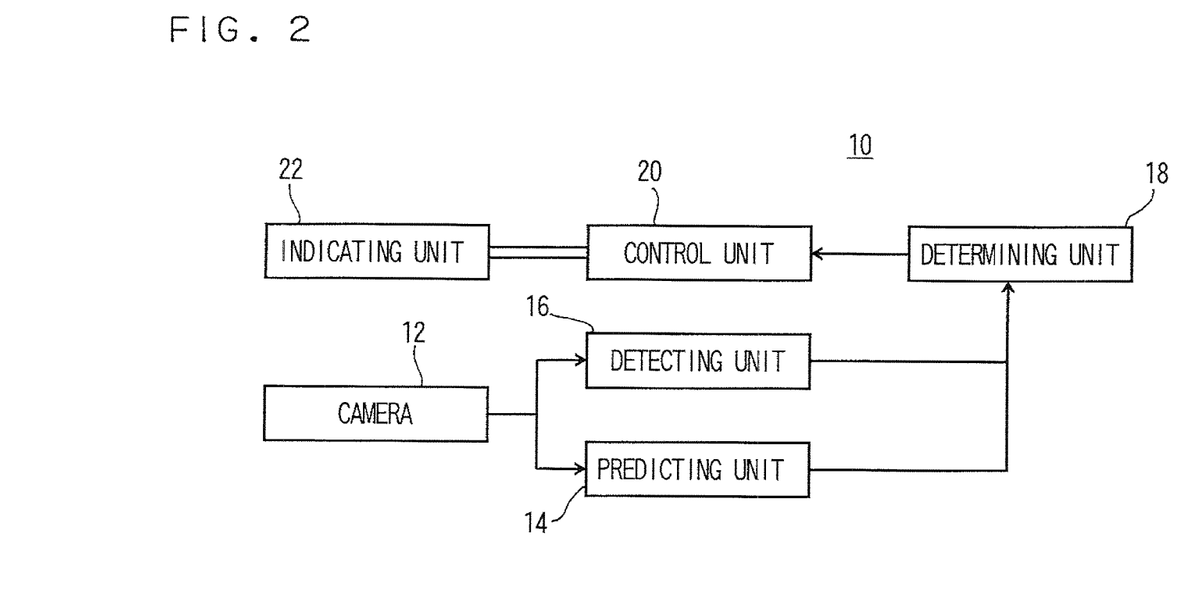
FIG. 2 is a block diagram of the monitoring device according to a first embodiment.

As shown in FIG. 2, the monitoring device 10 includes a camera 12 which takes pictures of customers, a predicting unit 14, a detecting unit 16, a determining unit 18, and a control unit 20 which causes the indicating unit 22 to do a tracking action.

Respective components 12 to 22 will be described in sequence below.

One camera 12 is fixed to a cash register base 2 of the self cash register 1 as shown in FIG. 1, takes pictures of a customer from the front, and acquires time-series images. For example, time-series images including thirty frames per minute are acquired. The acquired time-series images are output to the detecting unit 16 and the predicting unit 14.

The operation of the predicting unit 14 will be described.

First of all, the predicting unit 14 extracts points having significant change in luminance in images input from the camera 12 as characteristic points. For example, as shown in FIG. 5 and FIG. 6, positions having differences in luminance between adjacent pixels larger than the reference luminance differences set in advance are extracted as characteristic points (x points in the drawings). The characteristic points may be obtained from other pixel values (brightness or the like) instead of the luminance.

Subsequently, the predicting unit 14 calculates the amounts of movement and the directions of movement relating to extracted plurality of characteristic points m by using time-series images (images of 2 to 3 frames) by Lucas Kanade method or a block matching method.

Subsequently, the predicting unit 14 compares the amount of movement of the respective characteristic points m and the reference amounts of movement set in advance, respectively, and selects characteristic points m having the amounts of movement larger than the reference amount of movement. The predicting unit 14 causes the aggregation of the selected characteristic points m to belong to a first aggregation S.

Subsequently, the predicting unit 14 calculates an representative position A of the characteristic points m belonging to the first aggregations from the following expression (1), where Xm is a positional vector of the characteristic points m on the image (the vector including the extracted amount of movement and direction of movement):

$$A = \sum_{m \in S} Xm \qquad (1)$$

Figure 6:
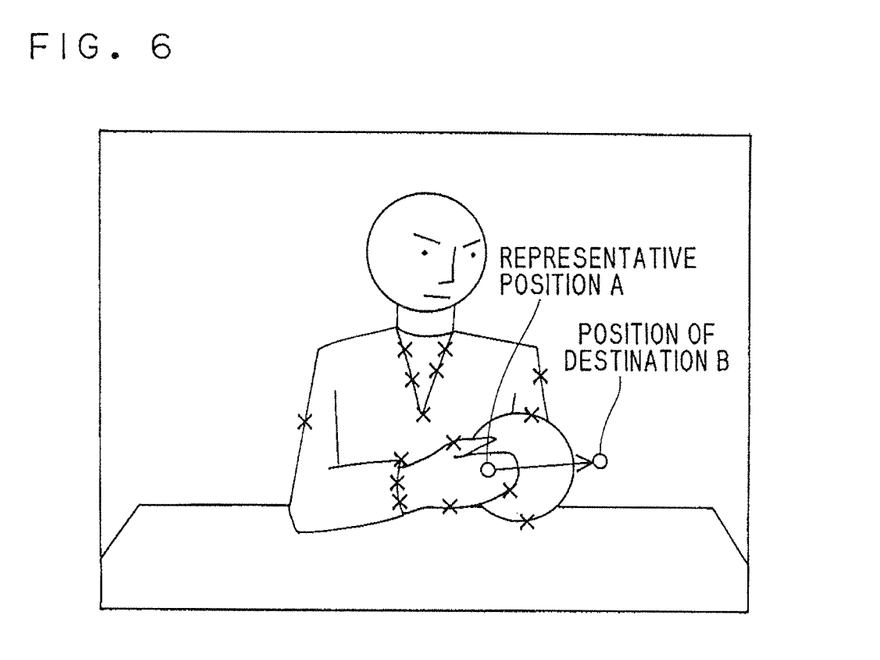
FIG. 6 is a second image taken by the camera.
Figure 7:
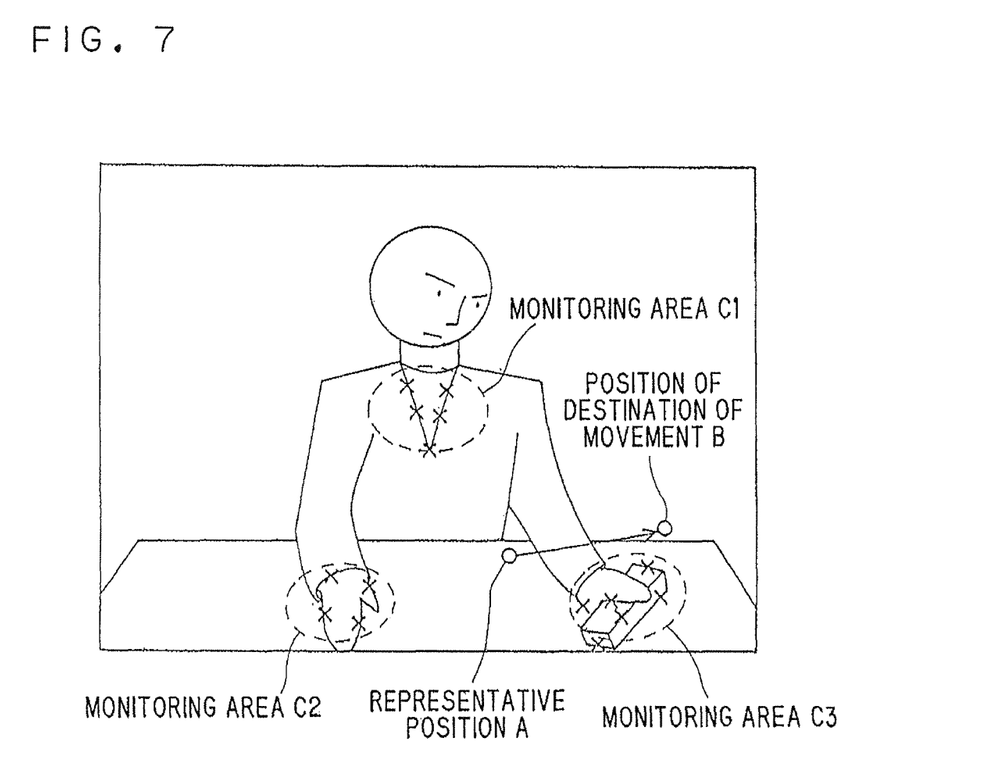
FIG. 7 is an image taken by a camera according to a second embodiment.

In FIG. 6, the representative position A is expressed by a hollow circle.

Subsequently, the predicting unit 14 predicts the position of destination B of the characteristic point m from the representative position A by a method of predicting described below.

A first predicting method of the predicting unit 14 will be described.

In the first predicting method, the predicting unit 14 sets the representative position A or a position in the vicinity of the representative position A as-is as the position of destination B and outputs the same to the determining unit 18. The predicting unit 14 outputs also the average value (the representative value) of the amounts of movement of the respective characteristic points m belonging to the aggregation S (hereinafter referred to as an "representative amount of movement") as well.

A second predicting method of the predicting unit 14 will be described. In the second predicting method, the predicting unit 14 calculates the position of destination B from the representative position A and the direction of movement of the characteristic point m.

First of all, the predicting unit 14 calculates an representative direction of movement V of the characteristic points m belonging to the first aggregation S from the following expression (2), where the vm is the vector of the direction of movement of the characteristic point m.

$$V = \sum_{m \in S} vm \qquad (2)$$

Subsequently, the predicting unit 14 causes the characteristic points having an angle formed between the vector of the direction of movement vm and the representative direction of movement V smaller than the reference angle set in advance among the characteristic points m belonging to the first aggregation S to belong to a second aggregation S2.

Subsequently, the predicting unit 14 sets the position of a characteristic point m having a vector vm of direction-of-movement located at a farthest position from the representative position A in the representative direction of movement V or of a characteristic point m at a close distance from the characteristic point m at the farthest position from among the characteristic points m belonging to the second aggregation S2 as the position of destination B and outputs the same to the determining unit 18. The reason why the characteristic point m having the vector vm of direction-of-movement at the farthest position is used is because the position where the object to be monitored is moved to a maximum extent is wanted to be used. The operation other than the method of calculating the position of destination B is the same as the first predicting method. In other words, the predicting unit 14 outputs also the representative amount of movement.

Although the predicting unit 14 calculates the representative direction of movement V from the vector vm of direction-of-movement, a direction defined according to the state may also be employed. The direction defined according to the state may be a direction having an x-component of the representative direction of movement V obtained by the expression (2). FIG. 6 shows the position of destination B obtained using the direction of the x-component of the representative direction of movement V by a hollow circle.

A third predicting method performed by the predicting unit 14 will be described.

First of all, the predicting unit 14 preserves the positions of destination B predicted by the first predicting method or the second predicting method in time series.

Subsequently, the predicting unit 14 predicts the position from the positions of destination B in time series by a linear prediction. The position predicted by the linear prediction is, for example, a position two or three framed ahead of the original position of the characteristic point m. The "linear prediction" may be replaced by a non-linear predictor such as a particle filter or other predicting methods similar thereto.

Subsequently, the predicting unit 14 outputs the predicted position as a new position of destination B and outputs the same to the determining unit 18. The operations other than the method of calculating the position of destination B are the same as those in the first predicting method. In other words, the predicting unit 14 outputs also the representative amount of movement.

The operation of the detecting unit 16 will be described.

First of all, the detecting unit 16 acquires a difference between time-series images input from the camera 12, and extracts changed areas on the basis of the difference thereof. First of all, the image of the cash register base 2 without a customer is taken by the camera 12 and is stored as a background image. As shown in FIG. 5, when the image of a case where a customer comes to the cash register base 2 is acquired, a changed area is extracted on the basis of the difference between the acquired image and the background image. In the case of FIG. 5, the detecting unit 16 extracts an entire upper half of the body of the customer as the changed area. As the image used to detect the changed area, an image taken at the same time as the time when the characteristic points m is extracted by the predicting unit 14 is used.

Subsequently, the detecting unit 16 calculates the position of center of gravity O of the changed area and outputs the same to the determining unit 18. In the case of FIG. 5, since the entire upper half body of the customer is the changed area, the detecting unit 16 detects the center of the entire upper half body as the position of the center of gravity O (a solid circle in FIG. 5).

The operation of the determining unit 18 will be described. The determining unit 18 determines a driving method which can give a person an impression that he or she is watched by the indicating unit 22 and, in addition, outputs an indicating position that the indicating unit 22 indicates to the control unit 20.

First of all, when the representative amount of movement input from the predicting unit 14 is smaller than a first threshold value set in advance, the determining unit 18 determines the position of center of gravity O input from the detecting unit 16 as the indicating position and outputs the same to the control unit 20.

Subsequently, after the determining unit 18 has determined the position of center of gravity O as the indicating position, the determining unit 18 converts the same to an indicating position which can be used for driving the indicating unit 22. The process of conversion will be described. Since the position of center of gravity O is expressed in a two-dimensional image position, the two dimensional image position is converted to the direction of the position of center of gravity O in the actual three-dimensional space with reference to the position of the camera 12 fixed to the cash register base 2 (as an original point). The conversion is performed by using a table prepared in advance. Subsequently, the predicting unit 14 calculates a pan angle and a tilt angle of a motor of the determining unit 18, described later, from the current position of the indicating unit 22 and the direction of the position of center of gravity O in the actual three-dimensional space. The pan angle and the tilt angle of the indicating unit 22 correspond to the indicating position.

In contrast, when the representative amount of movement input from the predicting unit 14 is larger than the first threshold value, the determining unit 18 determines the position of destination B as the indicating position and outputs the same to the control unit 20. The process of converting from the position of destination B to the indicating position is the same as the case of the position of center of gravity O.

It is defined in advance such that when the amount of average movement is equal to the first threshold value, either one of the position of center of gravity O and the position of destination B is determined as the indicating position.

The determining unit 18 determines the same position as the indicating position as an indicating position and retains the same for a certain period D (for example, several m seconds) after the above-described output.

The indicating unit 22 formed into a doll's face as shown in FIG. 1, and is provided upright from the top of the cash register base 2 of the self cash register 1 and is provided on the upper end of a supporting rod 3 so as to be rotatable. Also, a motor for causing the indicating unit 22 to rotate in the pan direction (the oscillation in the horizontal direction θ)-tilting direction (the oscillation in the vertical direction φ) is provided between the indicating unit 22 and the supporting rod 3.

The control unit 20 drives the motor of the indicating unit 22 so that the indicating unit 22 (a portion of the eyes of the doll) indicates the indicating position input by the determining unit 18. In other words, the control unit 20 rotates the face of the doll by the motor to perform the tracking operation toward the hands of the customer (the object to be monitored) using the indicating position (the pan angle and the tilt angle of the motor) to make the face of the doll look as if it monitors the hands of the customer.

Figure 3:
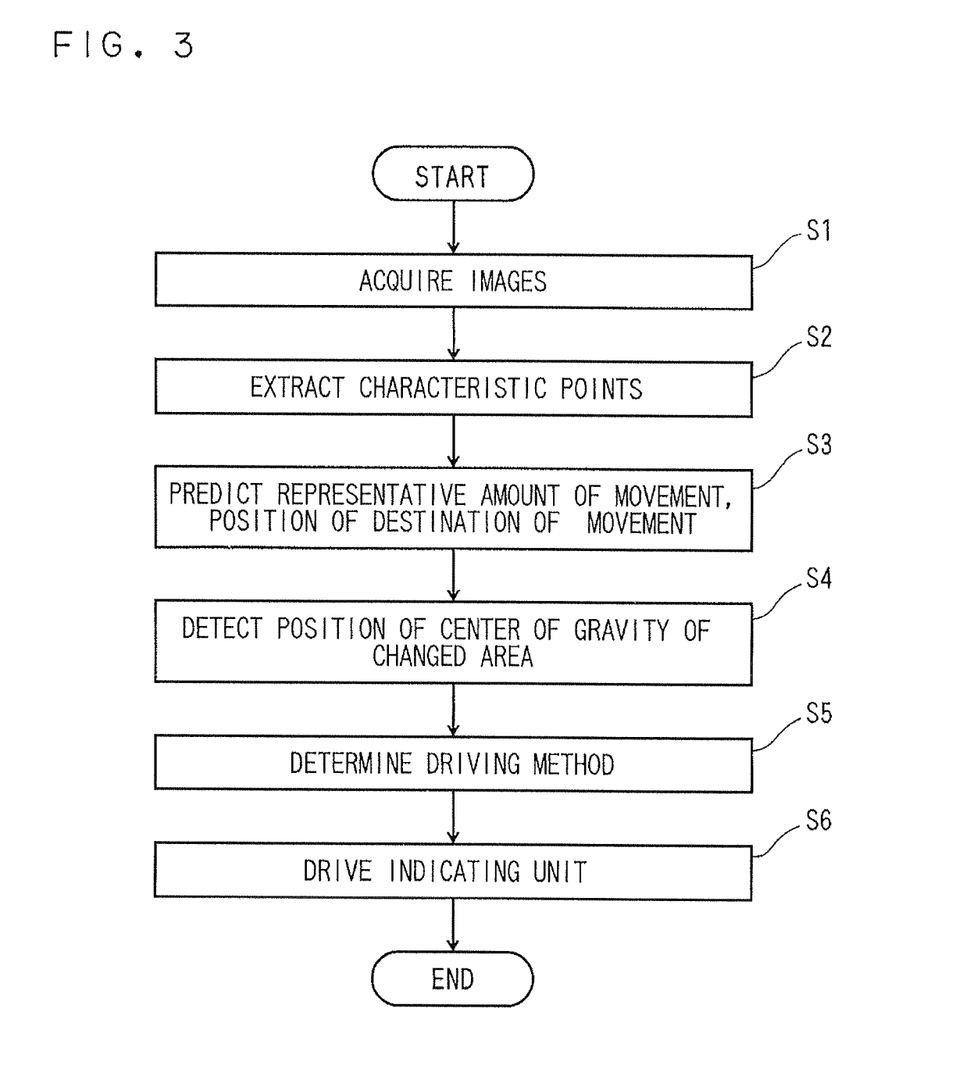
FIG. 3 is a flowchart showing a state of movement of the monitoring device.

Subsequently, the state of operation of the monitoring device 10 will be described on the basis of a flowchart shown in FIG. 3.

In Step S1, the camera 12 takes images of a customer from the front. The images are acquired in time series. Then, the procedure goes to Step S2.

In Step S2, the predicting unit 14 extracts characteristic points of the respective images, and the procedure goes to Step S3.

In Step S3, the predicting unit 14 predicts the representative amount of movement and the position of destination B. Then, the procedure goes to Step S4.

In Step S4, the detecting unit 16 detects the changed area in the images, and detects the position of center of gravity O of the changed area, and the procedure goes to Step S5.

In Step S5, the determining unit 18 determines the driving method and outputs the indicating unit.

In Step S6, the control unit 20 drives the motor of the indicating unit 22 on the basis of the indicating position to rotate the face of the doll toward the hands of the customer. Then, the procedure is terminated.

Figure 4:
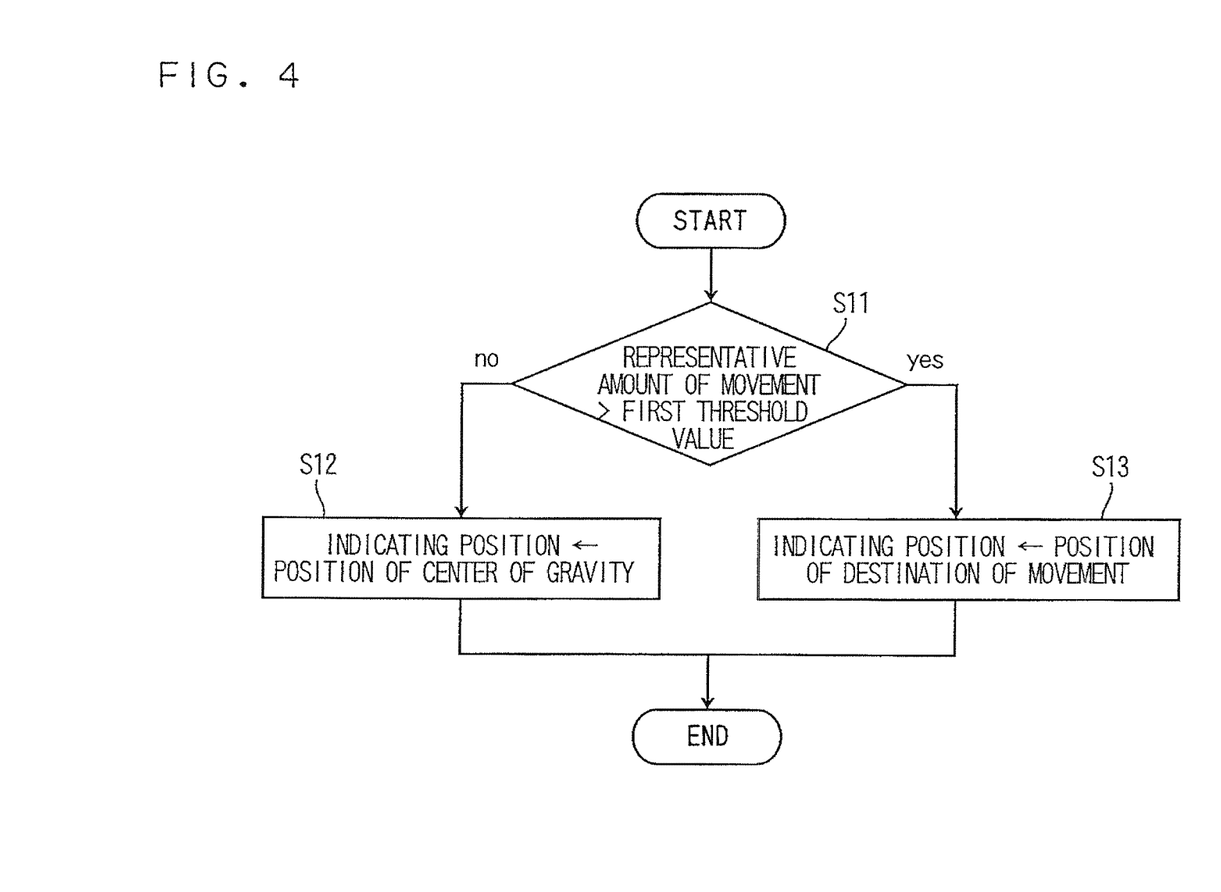
FIG. 4 is flowchart of a determining unit.

Referring now to a flowchart in FIG. 4, a method of drive determination performed by the determining unit 18 will be described.

In Step S11, the determining unit 18 compares the representative amount of movement predicted by the predicting unit 14 and the first threshold value and, when the representative amount of movement is smaller than the first threshold value, the procedure goes to Step S12 (the case of no), and when the representative amount of movement is larger than the first threshold value (the case of yes), the procedure goes to Step S13.

In Step S12, since the representative amount of movement is smaller than the first threshold value, the determining unit 18 determines the position of center of gravity O detected by the detecting unit 16 as the indicating position, and outputs the same to the control unit 20. Then, the procedure is terminated.

In Step S13, since the representative amount of movement is larger than the first threshold value, the predicting unit 14 determines the position of destination B predicted by the predicting unit 14 as the indicating position, and outputs the same to the control unit 20. Then, the procedure is terminated.

According to the embodiment, when the representative amount of movement is small, the position of center of gravity O is determined as the indicating position, and when the representative amount of movement is large, the position of destination B is determined as the indicating position, and the indicating unit 22 is caused to track the indicating position. Therefore, even when the response performance of the motor is low, it is possible to make the indicating unit look as if it indicates the object to be monitored.

Second Embodiment

Subsequently, the monitoring device 10 according to a second embodiment will be described with reference to FIG. 7 to FIG. 9.

A configuration of the monitoring device 10 in the second embodiment will be described with reference to a block diagram shown in FIG. 8.

Figure 8:
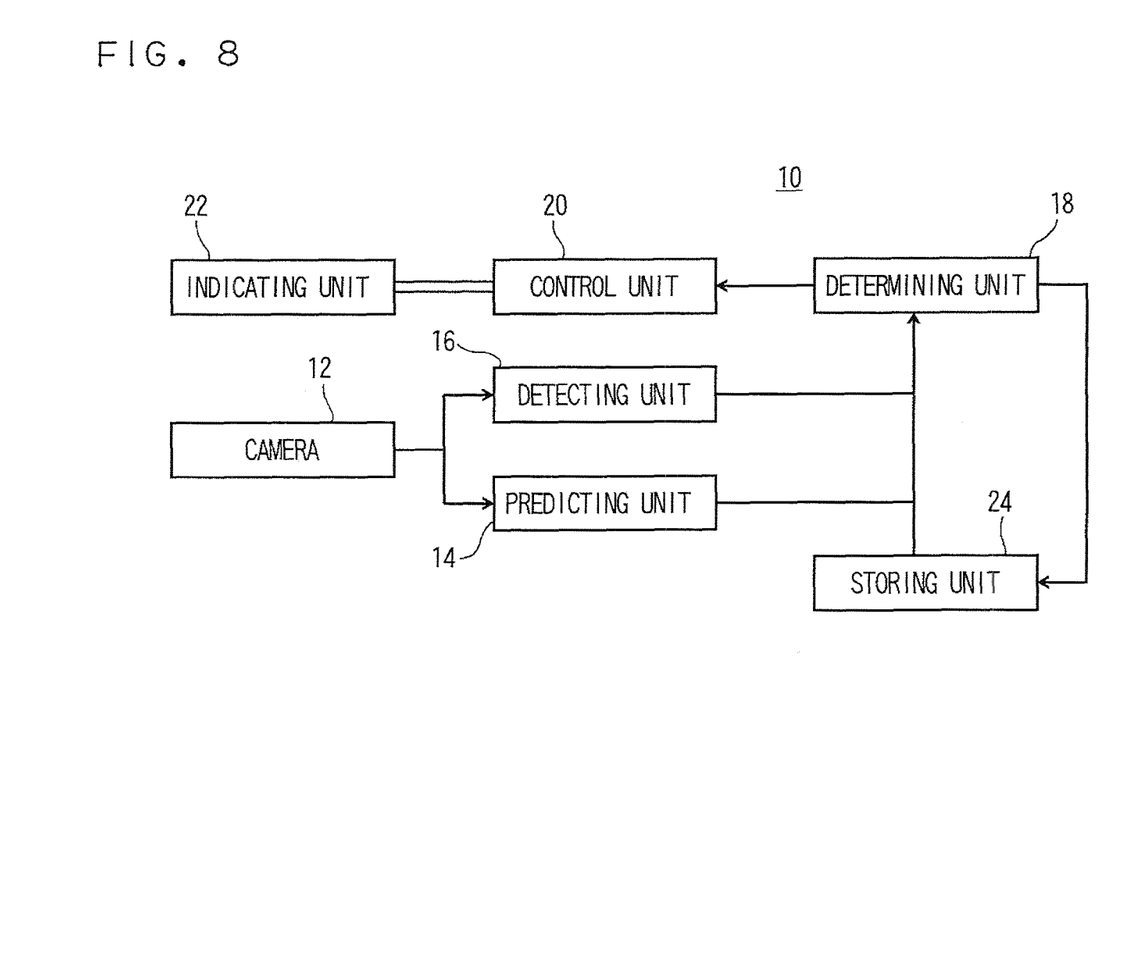
FIG. 8 is a block diagram of a monitoring device according to the second embodiment.
Figure 9:
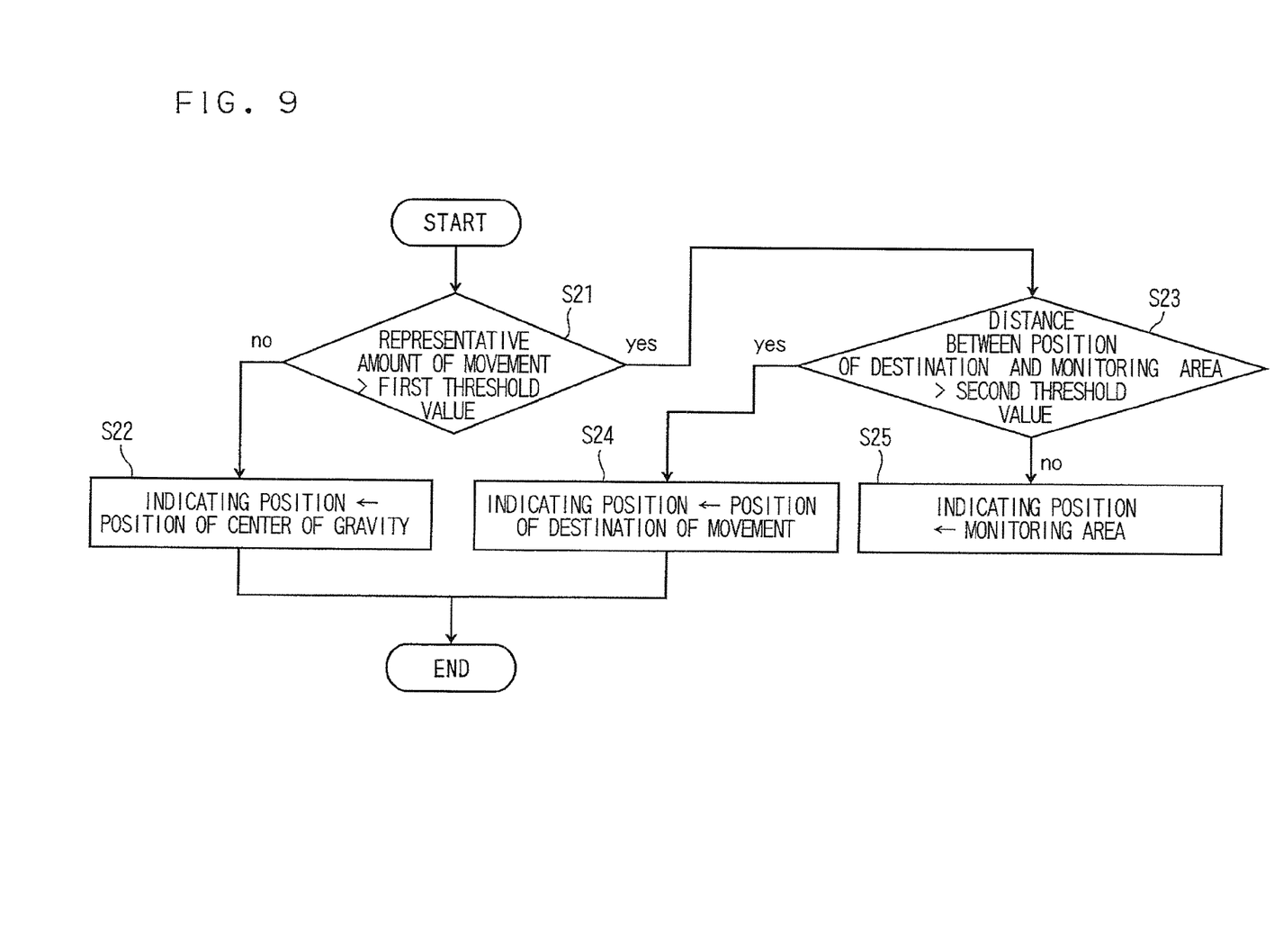
FIG. 9 is a flowchart showing a determining unit of the second embodiment.

As shown in FIG. 8, the monitoring device 10 includes the camera 12, the predicting unit 14, the detecting unit 16, the determining unit 18, and the control unit 20 which causes the indicating unit 22 to do a tracking action, and a storing unit 24.

The second embodiment is different from the monitoring device 10 in the first embodiment in that the storing unit 24 is additionally provided, and in the drive determination operation of the determining unit 18. Since the control unit 20, the camera 12, the detecting unit 16, and the predicting unit 14 are the same as those in the first embodiment, the descriptions about these members are omitted, and the storing unit 24 and the determining unit 18 will be described in detail.

The storing unit 24 stores a plurality of monitoring areas C in which the preset customer's hands (objects to be monitored) pass on an image. In FIG. 7, the monitoring areas C1 to C3 are set. The setting of the monitoring areas C will be performed, for example, in the following manner.

First of all, when the determining unit 18 outputs the positions of termination of the movement of the objects to be monitored, the storing unit 24 performs clustering on the basis of the distance between the positions of termination of the movement.

Subsequently, the determining unit 18 calculates a position of center of gravity J of the positions of termination of the movement belonging to the same class when the number of positions of termination of the movement included in the area obtained by performing the clustering reaches a preset number or larger.

Subsequently, the determining unit 18 determines the position of center of gravity J obtained by calculation or a peripheral area about the position of center of gravity J as a new candidate for the monitoring area.

Subsequently, when the distance between the new candidate for the monitoring areas and the monitoring area stored already in the storing unit 24 is larger than the preset reference distance, the determining unit 18 stores the new candidate for the monitoring area as a new monitoring area.

In the above-described description, the position of center of gravity J is set to be a position of center of gravity of the candidate for the new monitoring area. However, an arbitrary point in the area obtained by clustering may be set as the position of center of gravity of the candidate for the monitoring area.

Subsequently, the determining operation of the determining unit 18 will be described.

When the representative amount of movement input from the predicting unit 14 is smaller than a first threshold value, the determining unit 18 determines the position of center of gravity O input from the detecting unit 16 as the indicating position and outputs to the same to the control unit 20. The process of converting from the position of center of gravity O to the indicating position is the same as the conversion process of the position of center of gravity O in the first embodiment.

Subsequently, when the representative amount of movement input from the predicting unit 14 is larger than a first threshold value, the determining unit 18 calculates the distances between the position of destination B input from the predicting unit 14 and the plurality of monitoring areas C1 to C3 stored in the storing unit 24.

Finally, when the nearest distance among the plurality of calculated distances is shorter than the second threshold value, the determining unit 18 determines the monitoring area having the shortest distance (for example, the monitoring area C3) as a indicating position, and outputs the same to the control unit 20. In contrast when it is longer than the second threshold value, the determining unit 18 determines the position of destination B to be the indicating position and outputs the same to the control unit 20. The indicating position may be an arbitrary points in the monitoring area C3 and is, for example, the position of center of gravity. Also, the process of converting from the monitoring area C to the indicating position and the process of converting from the position of destination B to the indicating position are the same as the conversion process of the position of center of gravity O in the first embodiment.

Subsequently, a case where the determining unit 18 causes the storing unit 24 to store a new monitoring area C will be described.

First of all, the determining unit 18 stores the representative amount of movement and the position of destination B input from the predicting unit 14 in time series.

Subsequently, after the state in which the stored representative amount of movement is larger than the first threshold value continues by a predetermined number of times or more continuously in time series, the determining unit 18 sets the time when the representative amount of movement becomes smaller than the first threshold value as T.

Subsequently, the determining unit 18 sets the position of destination B obtained at the time T−1 or the time t close to the time T−1 as the position of termination of the movement.

Subsequently, the determining unit 18 outputs the position of termination of the movement to the storing unit 24.

Subsequently, the storing unit 24 stores the input position of termination of the movement or the peripheral area thereof as an additional monitoring area C4. The size of the peripheral area is set in advance.

Subsequently, the state of operation of the determining unit 18 in the monitoring device 10 of the embodiment will be described on the basis of a flowchart shown in FIG. 9.

In Step S21, when the representative amount of movement predicted by the predicting unit 14 is smaller than the first threshold value (the case of no), the procedure goes to Step S22, and when the representative amount of movement is larger than the first threshold value (the case of yes), the procedure goes to Step S23.

In Step S22, since the representative amount of movement is smaller than the first threshold value, the determining unit 18 determines the position of center of gravity O detected by the detecting unit 16 as the indicating position, and outputs the same to the control unit 20. Then, the procedure is terminated.

In Step S23, since the representative amount of movement is larger than the first threshold value, the determining unit 18 calculates the distances between the position of destination B predicted by the predicting unit 14 and the plurality of monitoring areas C1 to C3 stored in the storing unit 24, respectively. When the nearest distance from among the calculated plurality of distances is larger than the second threshold value (in the case of yes), the procedure goes to Step S24, and when the distance is shorter than the second threshold value (in the case of no), the procedure goes to Step S25.

In Step S24, since the distance between the monitoring area and the position of destination B is large, the determining unit 18 determines the position of destination B predicted by the predicting unit 14 as the indicating position, and outputs the same to the control unit 20. Then, the procedure is terminated.

In Step S25, since the position of destination B is close to the monitoring area C3, the point of center of gravity in the monitoring area C3 is determined as the indicating position, and the determining unit 18 outputs the same to the control unit 20. Then, the procedure is terminated.

According to the embodiment, when the predicted position of destination B is close to the monitoring area set in advance, the position in the monitoring area is determined as the indicating position ahead, the control unit 20 can cause the indicating unit 22 to perform the tracking operation further quickly even with the motor having a low response performance.

Third Embodiment

The monitoring 10 according to a third embodiment will be described. The third embodiment and the first embodiment are different in the operations of the detecting unit 16 and the determining unit 18.

First of all, the detecting unit 16 calculates dispersion of the changed area from the position of center of gravity O.

Subsequently, when the determining unit 18 determines the position of center of gravity O as the indicating position, the determining unit 18 compares the dispersion calculated by the detecting unit 16 and the predetermined value set in advance.

Subsequently, when the dispersion is larger than the predetermined value, the determining unit 18 determines that the position of center of gravity O is noise, and goes to the process of the next frame without outputting the indicating position. In contrast, when the dispersion is smaller than the predetermined value, the determining unit 18 determines the position of center of gravity O as the indicating position and outputs the same to the control unit 20.

According to the third embodiment, when the detecting unit 16 can only detect the incorrect position of center of gravity O due to the presence of noise, the procedure goes to the next frame, and hence the indicating unit 22 can indicate the customers' hands always accurately.

(Modification)

In the embodiments described above, the position of center of gravity O is detected in advance by the detecting unit 16. However, it is also possible to configure the detecting unit 16 to detect the position of center of gravity O only when the representative amount of movement input to the determining unit 18 from the predicting unit 14 is smaller than the first threshold value.

In the embodiments described above, the face of the doll which imitates the face of human has been exemplified as the indicating unit 22. However, the invention is not limited thereto, but may be a substance which is capable of showing the indicating position for human being such as a device imitating a finger or a laser pointer. Eye or a finger of the human being displayed on a display screen is also applicable.

In the embodiments described above, the pan angle-tilt angle of the motor are used as the indicating position. However, the invention is not limited thereto, and the determining unit 18 may convert into information on the indicating position according to a driving unit configured to drive the indicating unit 22. For example, when projecting on the display screen, it is the image information on eyes or a finger of the human being.

In the embodiments described above, the monitoring device 10 to be provided in the self cash register 1 has been described. However, the invention is not limited thereto, and a configuration in which the monitoring device 10 may be provided in an ATM to monitor the dishonest acts of a customer who operates the ATM. Also, it is also possible to arrange a plurality of cameras 12 for monitoring in the room to monitor human beings moving in the room. In this case, the indicating unit 22 may be configured to apply a laser beam to moving human beings or may put on a light at a position nearest to the moving human being is also possible.

The monitoring device 10 may be implemented using a general-purpose computer as a basic hardware. In other words, the detecting unit 16, the predicting unit 14, the determining unit 18, and the storing unit 24 may be implemented by causing a processor mounted on the computer to execute a program. At this time, the monitoring device 10 may be implemented by installing the above-described program on the computer in advance, or may be implemented by storing the program in a recording medium such as a CD-ROM or by distributing the program via a network, thereby allowing the user to install the program on the computer as needed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A monitoring device comprising:
   an indicator, comprising a facial feature, for indicating an object to be monitored;
   a motor configured to move the indicator;
   a camera configured to take an image of the object to be monitored and acquire time-series images;
   a computer processor configured to
      extract a plurality of characteristic points from the time-series images, calculate amounts of movement of the respective characteristic points, predict a position of destination of the characteristic points belonging to a first aggregation including characteristic points having an amount of movement larger than a reference amount of movement set in advance, and obtain a representative amount of movement that is a representative value of amounts of movement of the respective characteristic points belonging to the first aggregation;
      extract a changed area on the basis of a difference between time-series images, and detect a position of a center of gravity of the changed area;
      determine the position of destination as an indicating position when the representative amount of movement is larger than a first threshold value and determine the position of the center of gravity as the indicating position when the representative amount of movement is smaller than the first threshold value; and
   a control unit configured to control the motor to cause the indicator to indicate the indicating position.

2. The device according to claim 1, further comprising:
   storage configured to store a plurality of monitoring areas in the images acquired by the camera, wherein
   the computer processor is further configured to
   set a position in one of the monitoring areas as the indicating position when the representative amount of movement is relatively larger than the first threshold value and the distances between respective positions in the plurality of monitoring areas and the position of destination are relatively smaller than a preset second threshold value.

3. The device according to claim 2, wherein
   the computer processor is further configured to
   output the position of destination at a time point when the determination to set the position of destination as the indicating position is performed continuously by a reference number of times set in advance and the determination not to set the position of destination as the indicating position is performed as a position of termination of movement to the storage, and
   the storage stores the position of termination of movement or a peripheral area thereof as a new monitoring area.

4. The device according to claim 1, wherein the computer processor is further configured to
   calculate the representative amount of movement by averaging the amounts of movement of the respective characteristic points belonging to the first aggregation and a representative direction of movement by averaging the directions of movement of the respective characteristic points, and set a representative position of the respective characteristic points having the representative amount of movement and the representative direction of movement and belonging to the first aggregation to the position of destination.

5. The device according to claim 1, wherein
the computer processor is further configured to
calculate the representative amount of movement by averaging the amounts of movement of the respective characteristic points belonging to the first aggregation and a representative direction of movement by averaging the directions of movement of the respective characteristic points, set a representative position of the respective characteristic points having the representative amount of movement and the representative direction of movement and belonging to the first aggregation, obtain a second aggregation including the characteristic points having an angle formed between the direction of movement and the representative direction of movement of the characteristic points belonging to the first aggregation smaller than a reference angle set in advance, and set the position of the characteristic point located at the farthest position along the representative direction of movement from the representative position among the characteristic points belonging to the second aggregation as the position of destination.

6. The device according to claim 1, wherein the computer processor is further configured to determine the indicating position and then retain the determination of the indicating position until the lapse of a certain period set in advance.

7. The device according to claim 1, wherein the computer processor is further configured to determine the position of the center of gravity as the indicating position when dispersion of the changed area is smaller than a predetermined value set in advance.

8. A method of monitoring with a monitoring device including an indicator, comprising a facial feature, for indicating an object to be monitored, a motor configured to move the indicator, and a camera to take images of the object to be monitored to obtain time-series images, the method comprising:

extracting a plurality of characteristic points from the time-series images, calculating amounts of movement of the respective characteristic points, predicting a position of destination of the characteristic points belonging to a first aggregation including characteristic points having an amount of movement larger than a reference amount of movement set in advance, and obtaining a representative amount of movement that is a representative value of amounts of movement of the respective characteristic points belonging to the first aggregation;

extracting a changed area on the basis of a difference between time-series images, and detecting a position of a center of gravity of the changed area;

determining the position of destination as an indicating position when the representative amount of movement is larger than a first threshold value, and determining the position of the center of gravity as the indicating position when the representative amount of movement is smaller than the first threshold value; and controlling the motor to cause the indicator to indicate the indicating position.

9. A program stored in a non-transitory computer readable medium, the program, when executed, causing a computer to control a monitoring device including an indicator, comprising a facial feature, for indicating an object to be monitored, a motor configured to move the indicator, and a camera to take images of the object to be monitored to obtain time-series images, the computer controlling the monitoring device to at least:

extract a plurality of characteristic points from the time-series images, calculate amounts of movement of the respective characteristic points, predict a position of destination of the characteristic points belonging to a first aggregation including characteristic points having an amount of movement larger than a reference amount of movement set in advance, and obtain a representative amount of movement that is a representative value of amounts of movement of the respective characteristic points belonging to the first aggregation;

extract a changed area on the basis of a difference between time-series images, and detect a position of a center of gravity of the changed area;

determine the position of destination as an indicating position when the representative amount of movement is larger than a first threshold value, and determine the position of the center of gravity as the indicating position when the representative amount of movement is smaller than the first threshold value; and control the motor to cause the indicator to indicate the indicating position.

* * * * *